United States Patent
Wallentin et al.

(10) Patent No.: US 10,462,807 B2
(45) Date of Patent: Oct. 29, 2019

(54) METHODS, APPARATUS, AND SYSTEMS FOR DETERMINING COMMUNICATION PRIORITY

(71) Applicant: TELEFONAKTIEBOLAGET LM ERICSSON (PUBL), Stockholm (SE)

(72) Inventors: Pontus Wallentin, Linköping (SE); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 148 days.

(21) Appl. No.: 15/305,500

(22) PCT Filed: May 8, 2015

(86) PCT No.: PCT/SE2015/050514
§ 371 (c)(1),
(2) Date: Oct. 20, 2016

(87) PCT Pub. No.: WO2015/171066
PCT Pub. Date: Nov. 12, 2015

(65) Prior Publication Data
US 2017/0041942 A1 Feb. 9, 2017

Related U.S. Application Data

(60) Provisional application No. 61/991,248, filed on May 9, 2014.

(51) Int. Cl.
*H04W 72/12* (2009.01)
*H04W 76/14* (2018.01)
(Continued)

(52) U.S. Cl.
CPC ... *H04W 72/1242* (2013.01); *H04W 72/1231* (2013.01); *H04W 72/1289* (2013.01);
(Continued)

(58) Field of Classification Search
CPC . H04W 24/08; H04W 72/10; H04W 72/1231; H04W 72/1242; H04W 74/08;
(Continued)

(56) References Cited

U.S. PATENT DOCUMENTS 8,755,831 B2 * 6/2014 Brewer ............... H04W 72/10
455/450
9,474,096 B2 * 10/2016 Ayadurai ............ H04W 8/005
(Continued)

FOREIGN PATENT DOCUMENTS

WO 2013191360 A1 12/2013

OTHER PUBLICATIONS

International Search Report and Written Opinion dated Oct. 13, 2015, in International Application No. PCT/SE2015/050514, 12 pages.
(Continued)

*Primary Examiner* — Asad M Nawaz
*Assistant Examiner* — Thomas R Cairns
(74) *Attorney, Agent, or Firm* — Sage Patent Group

(57) ABSTRACT

A method includes determining, by a network device, a priority for communicating data. The method further includes determining a priority indicator based on the determined priority. The method further includes communicating, by the network device, the priority indicator included within a scheduling assignment (SA) to a data transmitter. The method further includes communicating, by the network device, the data. The data has a priority level that exceeds a predetermined priority threshold.

17 Claims, 14 Drawing Sheets

(51) Int. Cl.
*H04W 74/08* (2009.01)
*H04W 24/08* (2009.01)
*H04W 92/18* (2009.01)

(52) U.S. Cl.
CPC ............ *H04W 24/08* (2013.01); *H04W 74/08* (2013.01); *H04W 76/14* (2018.02); *H04W 92/18* (2013.01)

(58) Field of Classification Search
CPC ... H04W 76/023; H04W 76/14; H04W 92/08; H04W 72/1289; H04W 92/18
See application file for complete search history.

(56) References Cited

U.S. PATENT DOCUMENTS

| | | |
|---|---|---|
| 9,578,651 B2 * | 2/2017 | Ryu ................. H04W 72/1247 |
| 9,578,667 B2 * | 2/2017 | Wei .................... H04L 12/6418 |
| 2014/0112233 A1 | 4/2014 | Bodas et al. |
| 2017/0019812 A1 * | 1/2017 | Lee ....................... H04W 76/14 |

OTHER PUBLICATIONS

3GPP, R1-133181, "Unicast, groupcast/broadcast, and relay for public safety D2D communications"; whole document, Aug. 10, 2013 (Aug. 10, 2013), 11 pages.
3GPP, R2-141221, "MAC functionalities for D2D communication"; whole documnent, Mar. 22, 2014 (Mar. 22, 2014), 4 pages.
3GPP, R2-140628, "Overview of MAC functionality for D2D Communication"; whole document, Feb. 1, 2014 (Feb. 1, 2014), 6 pages.

* cited by examiner

METHODS, APPARATUS, AND SYSTEMS FOR DETERMINING COMMUNICATION PRIORITY

CROSS REFERENCE TO RELATED APPLICATION(S)

This application is a 35 U.S.C. § 371 National Phase Entry Application from PCT/SE2015/050514, filed May 8, 2015, designating the United States, and also claims the benefit of U.S. Provisional Application No. 61/991,248, filed May 9, 2014. The disclosures of both applications are incorporated herein in their entirety by reference.

TECHNICAL FIELD

This disclosure relates to providing priority to different types of communications between devices, including device-to-device (D2D) communications.

BACKGROUND

Device-to-device communication is a well-known and widely used component of many existing wireless technologies, including ad-hoc and cellular networks. Examples include Bluetooth and several variants of the IEEE 802.11 standards suite such as WiFi Direct. Some of these systems may operate in an unlicensed spectrum.

Recently, device-to-device (D2D) communications, as an underlay to cellular networks have been proposed to take advantage of the physical proximity of communicating devices and at the same time to allow devices to operate in a controlled interference environment to provide proximity-based services (ProSe). It is suggested that such device-to-device communication shares the same spectrum as the cellular system, by reserving some of the cellular uplink resources for device-to-device purposes. Allocating dedicated spectrum for device-to-device purposes is a less likely alternative since spectrum is a scarce resource and dynamic sharing between the device-to-device services and cellular services is more flexible and provides higher spectrum efficiency. The transmission mode when sending data during D2D communication may be either unicast with a specific user equipment (UE) as the receiver; multicast (e.g., group-cast) with a group of UEs as receivers; or broadcast with all UEs as receivers.

With connectionless D2D communication, data can be sent from one device to another device without prior arrangement, thereby reducing the overhead and increasing the communication capacity of the cellular system which is crucial in emergency situations. The source device, a UE, communicates data to one (unicast) or more devices (multicast/group-cast/broadcast), without first ensuring that the recipients are available and ready to receive the data. Connectionless communications may be used for one-to-one or one-to-many communications, but it is particularly effective for multicast and broadcast transmissions and, thus, well-suited for broadcast and group communication. The connectionless communication may be realized, for example, via PHY unicast, multicast, group-cast, and/or broadcast transmissions. With PHY broadcast transmissions, the transmissions may still be turned into unicast, group-cast, or multicast at higher layers. For example, in the MAC layer, multicast or even unicast addresses may be used. Alternatively, if using broadcast on both PHY and MAC, multicast or unicast IP addresses may be used at the IP layer.

One of the ways to support efficiently D2D communication is to use a scheduling assignment (SA). FIG. 2 illustrates the data transmission procedure from UE-A to UE-B that are both outside network coverage at the time of data transmission. As a prerequisite, UE-A and UE-B are pre-configured with, for example, resource pool information (time and frequency configuration) used later for data transmission. When UE-A needs to communicate data to UE-B, it sends a sync signal, which later is used as a time reference by UE-B. The next step is to communicate a scheduling assignment, followed by the actual data.

Scheduling assignments (SA) are control messages used for direct scheduling of D2D communications. SAs are communicated by the UE that intends to transmit D2D data and are received by the UEs that are potentially interested in the D2D data. The SAs are communicated on dedicated resources characterized by time and frequency, and is typically a sparse resource. SAs provide useful information that can be used by the receiver to correctly decode the D2D data transmission associated to the SA. For example, the useful information can be the resources for data transmission, the modulation/coding parameters, timing information, identities for the transmitter and/or receiver, etc. SAs may be communicated prior to the actual data transmission, so that a receiver is able to selectively receive data based on the content of the SAs. These data transmissions scheduled by a SA may be known as a "transmission pattern".

In FIG. 3, an example is shown of the time and frequency resources used to schedule assignments and data. It is assumed that the frequency resource for data is the same as for the SA. The time resource for data is provided by the time-pattern information element in the SA itself.

By monitoring the identities carried in the scheduling assignments (SA), discontinuous reception (DRX) is enabled in the UE. For example, for multicast D2D communication, the identity in the SA is derived from the identifier of the multicast group, such as the eight least significant bits of what is known as the Layer-2 Group ID. Thus a UE which is interested in receiving data from one or several multicast groups, needs to check the SAs for the corresponding identities. When the receiving UE receives an SA, with an identity which corresponds to one of the multicast groups that the UE is interested in, the receiving UE may decode the data pointed out by the other information carried in the SA.

A method exists for providing redundancy in the scheduling assignments. For example, the same content is communicated by multiple SAs, and the transmitter may communicate only a subset of the redundant SAs, based on autonomous decisions or predefined patterns. As such, this allows the transmitter to periodically monitor the SA resources.

Thus, the scheduling assignments and communication data, for D2D, may communicate on a scarce resource pool associated with time and/or frequency within a spectrum. The UE may select the resource(s) to communicate the SAs and data by using some rules or by trying to find a free resource based on previous SA cycles. However, in cases of high amounts of traffic within a network, these resource pools may become full and thus, there is no way to prioritize between different UEs. Moreover, there is no way for one UE to claim a SA and/or data resource in case of this UE having "higher priority" than other UEs.

SUMMARY

According to exemplary embodiments, a method includes determining, by a network device, a priority for communicating data. The method further includes determining a priority indicator based on the determined priority. The method further includes communicating, by the network device, the priority indicator included within a scheduling assignment (SA) to a data transmitter. The method further includes communicating, by the network device, the data. The data has a priority level that exceeds a predetermined priority threshold.

According to exemplary embodiments, a device includes a processor and a computer readable medium coupled to the processor. The computer readable medium contains instructions executable by the processor. The device is operative to determine a priority for communicating data. The device is operative to determine a priority indicator based on the determined priority. The device is operative to communicate the priority indicator included within a scheduling assignment (SA) to a data transmitter. The device is operative to communicate the data. The data has a priority level that exceeds a predetermined priority threshold.

DETAILED DESCRIPTION

Figure 1:
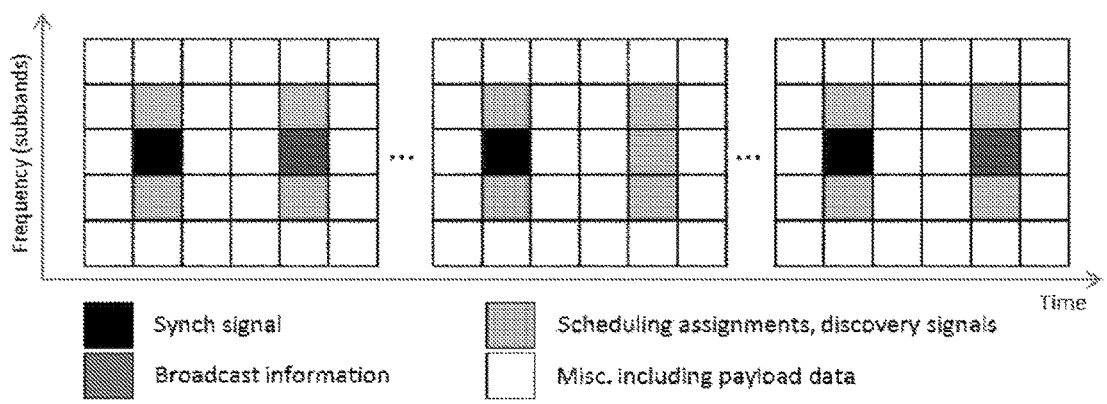
FIG. 1 shows an example resource component.
Figure 2:
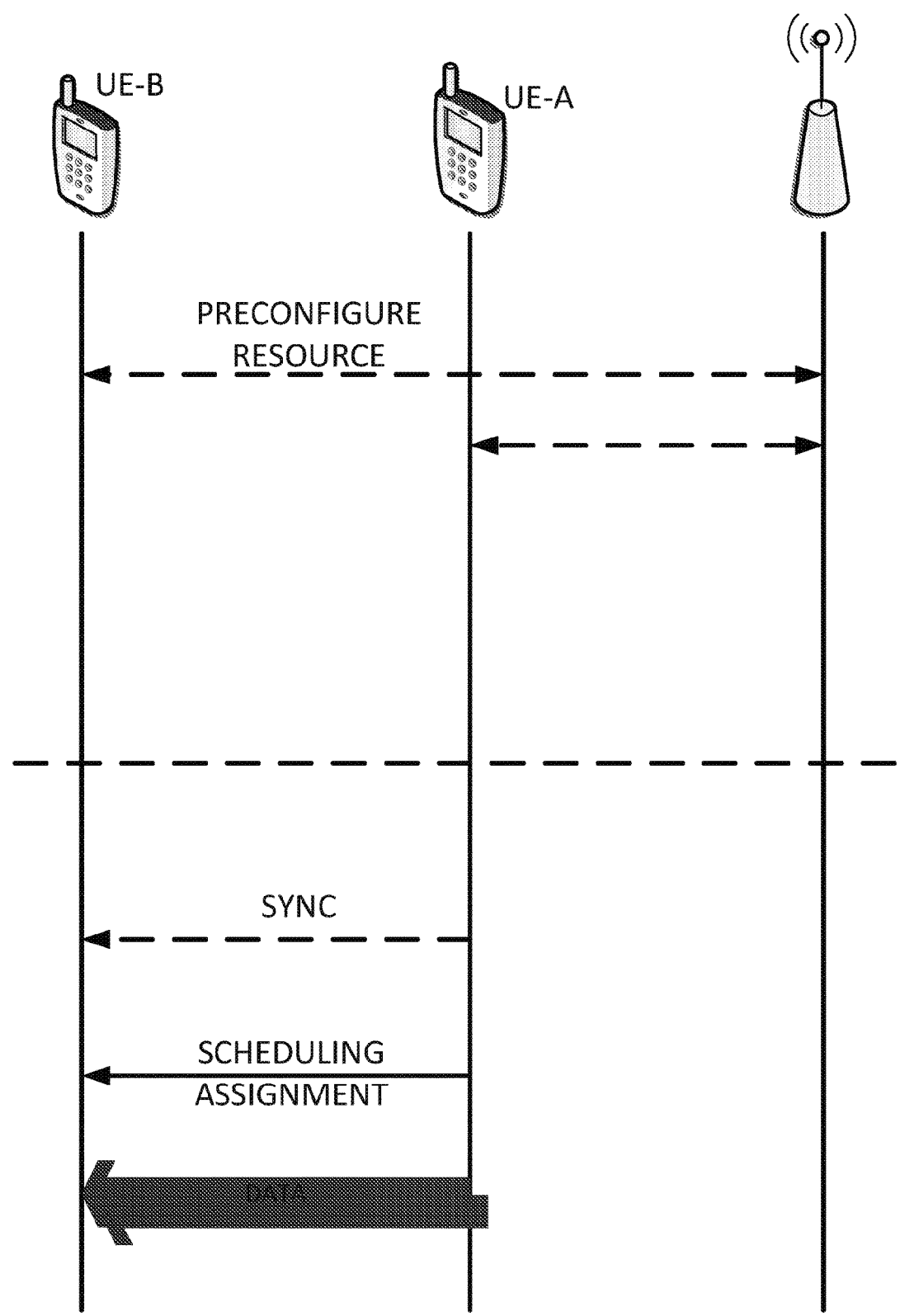
FIG. 2 shows an example data transmission procedure.
Figure 3:
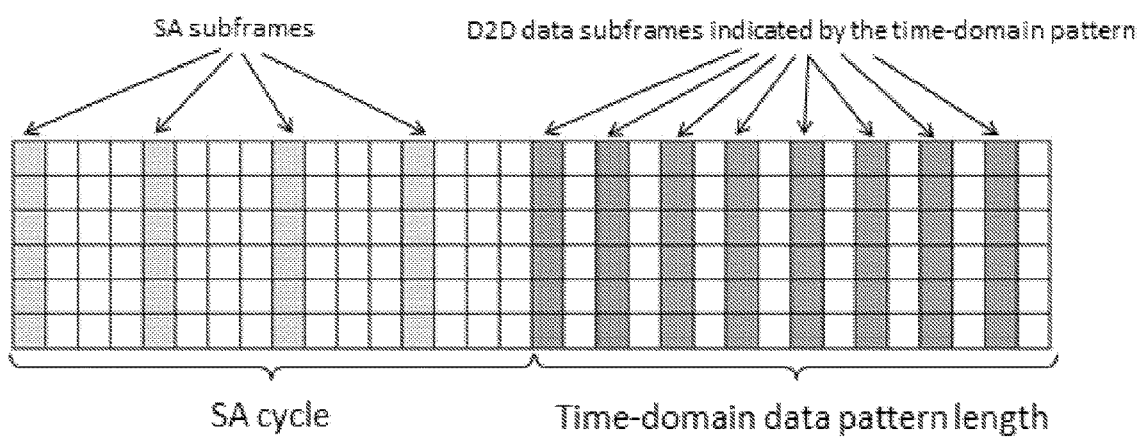
FIG. 3 shows examples of frequency and time resources used for scheduling assignments and data.

Systems, apparatus, and/or methods described herein may prioritize communications, including device-to-device (D2D) communications. In embodiments, to prioritize D2D communications, the present embodiments comprise of one or more features that may be mandatory or optional: (i) triggering which may include a monitoring entity (e.g. a UE) that detects the need to indicate priority by, for example, monitoring resource usage or because it is going to communicate data with a particular priority level (e.g., high priority, low priority, priority level 1, priority level 2, etc.); (ii) communicating a priority indicator that can be performed by a scheduling entity (e.g., a UE) that signals a priority indicator as part of a scheduling assignment (SA); (iii) receiving priority indicator which may include a data transmitter (e.g. a UE) that receives the priority indicator and takes actions based on receiving the priority indicator (e.g., to free or refrain from using a data transmission resource); (iv) resuming, using a data transmission resource for a particular priority level of data after a predetermined time/priority indicators; (v) sending the priority indicator and the associated data to a receiver that takes into account prioritizing detection of the data as compared to other operations in the receiver (e.g., reception or transmission of other data or channels); and/or (vi) communicating "high priority" data which includes a data transmitter (e.g. a UE) that communicates data with high priority, based on a freed resource, such as time, frequency, and/or any other characteristic of a network (e.g., a cellular network). Some embodiments may also allow for resuming, using a data transmission resource for a particular priority level of data after a predetermined time/priority indicator. In embodiments, the resuming may include other transmitters that are allowed to use the data transmission resource for a data with a particular priority level, e.g. after a predetermined time and/or based on received priority indicator(s). In further embodiments, the receiver(s) that detect the priority indicator and the associated data, a priority may be taken into account for prioritizing detection of the data as compared to other operations in the receiver (e.g., reception or transmission of other data or channels).

Accordingly, embodiments provide a QoS mechanism allowing high priority D2D communication data to be sent when network resources (e.g., time, frequency, cell, etc.) are full. Additionally, the present invention provides a pre-emption mechanism where UEs refrains from using a D2D data transmission resource. The present invention may also provide a pre-emption mechanism where receiving UEs are able to prioritize D2D data reception as compared to other D2D operations. As a result, the present invention provides a solution to handling scarce spectrum resources (e.g., within a cellular system) by indicating a relative priority level for a D2D data transmission, associated with proximity-based services, in a scheduling assignment. In embodiments, proximity-based services may be messages (e.g. text messages, audio message, video messages, multimedia messages, etc.) that can benefit from different UEs being within a particular distance (e.g., 100 meters, 500 meters, etc.). For example, the messages could be an emergency text messages (e.g., medical help), providing information about various businesses (e.g., an apartment is for rent within 200 yards of the UE), and/or sending video content (e.g., a movie). In embodiments, proximity may be a distance that allows two or more devices, such as UEs, to perform D2D communications between themselves. In embodiments, the messages may be associated with phone communications, multi-media communications, global satellite positioning (GPS) based communications, and/or other types of communications that can be performed by a UE.

Furthermore, additional embodiments involve a second node (e.g., a potential interferer) that modifies its own behavior upon reception of the priority indication from the first node. Additionally, the second node (e.g., a potential receiver) can also modify its behavior upon reception of the priority indication from the first node.

Figure 4:
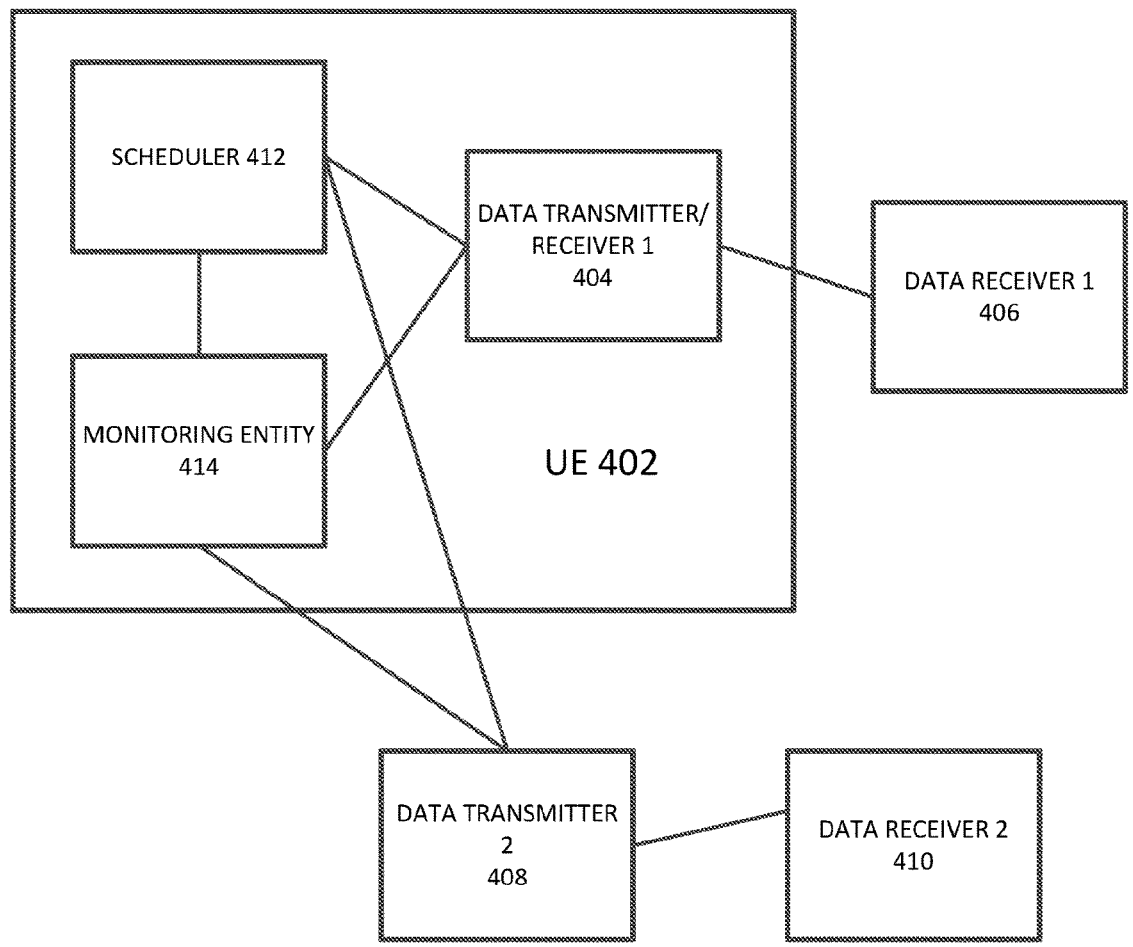
FIG. 4 shows an example functional block diagram.

FIG. 4 shows an example block diagram in accordance with exemplary embodiments FIG. 4 shows UE 402, data transmitter/receiver 1 404, data receiver 1 406, data transmitter 2 408, data receiver 2 410, scheduler 412, and monitoring entity 414.

UE 402 may be any computing or network device capable of performing wired and/or wireless communications. For example, UE 402 may be a mobile phone, a smart phone, a hand-held gaming system, a personal digital assistant (PDA), a wearable device (e.g., a watch, vision wear, etc.), a television, a gaming device, and/or any other type of device. In embodiments, UE 402 may have capabilities to communicate with other UEs via D2D communications.

Data transmitter/receiver 1 404 may be any computing or network device with hardware capabilities that allow data transmitter/receiver 1 404 to perform communications with other device, such as other UEs. In embodiments, data transmitter/receiver 1 404 is a part of UE 402 which uses D2D communication and may determine when to communicate data based on the data's priority level (e.g., communicate data that has a priority level higher than other data). While data transmitter/receiver 1 404 is shown as one component within UE 402, in additional embodiments, the transmitter component and the receiver component may be separate components stored by UE 402.

Data receiver 1 406 may be any computing or network device that can communicate wired and/or wirelessly with other devices. In embodiments, data receiver 1 406 may be a UE, such as UE 402. In embodiments, data receiver 1 406 may be a part of a UE which will receive the data (e.g., priority data) communicated by data transmitter 1. While FIG. 4 shows one data receiver 1 406, there may exist several instances of data receiver 1 406 which may occur for one-to-many communications (e.g., multicast or group-cast communications).

Data transmitter 2 408 may be any computing or network device that can communicate wired and/or wirelessly with other devices. In embodiments, data transmitter 2 408 may be part of a UE, such as UE 402. In embodiments, data transmitter 2 408 is part of a UE which can perform D2D communications. In embodiments, data transmitter 2 408 may be a UE that communicates data which has a lower priority (e.g., low priority) than other communicated data. While data transmitter 2 408 is shown as one component, in additional embodiments, the transmitter component and the receiver component may be separate components stored by one or more devices.

Data receiver 2 410 may be any computing or network device that can communicate wired and/or wirelessly with other devices. In embodiments, data receiver 2 410 may be part of a UE, such as UE 402. In embodiments, data receiver 2 410 may receive data that has a higher level of priority than other data being communicated by data transmitter 2 408. In embodiments, there may be multiple data receivers 2 410. Scheduler 412 may be any computational device that can communicate wired and/or wirelessly with other devices. In embodiments, scheduler 412 may be a part of the UE, in this case UE 402, that includes data transmitter/receiver 1 404. In additional embodiments, scheduler 412 can be part of a radio base station. For example, if the D2D communication takes place where data transmitter/receiver 1 404 is within network coverage provided by an evolved NodeB (eNB), then the eNB will interact with data transmitter/receiver 1 404. In additional embodiments, scheduler 412 may be a part of the same UE hosting data transmitter 2 408. Thus, the scheduler communicates scheduling assignments (SAs) on behalf of a data transmitter when, for example, the data transmitter is allowed to send data.

Monitoring entity 414 may be any computational device that can communicate wired and/or wirelessly with other devices. In embodiments, monitoring entity 414 may be a part of the same UE hosting data transmitter 1. In additional embodiments, monitoring entity 414 may be a part of a radio base station, such as an eNB, in case the D2D communication takes place where data transmitter 1 is within network coverage of the radio base station.

Figure 5:
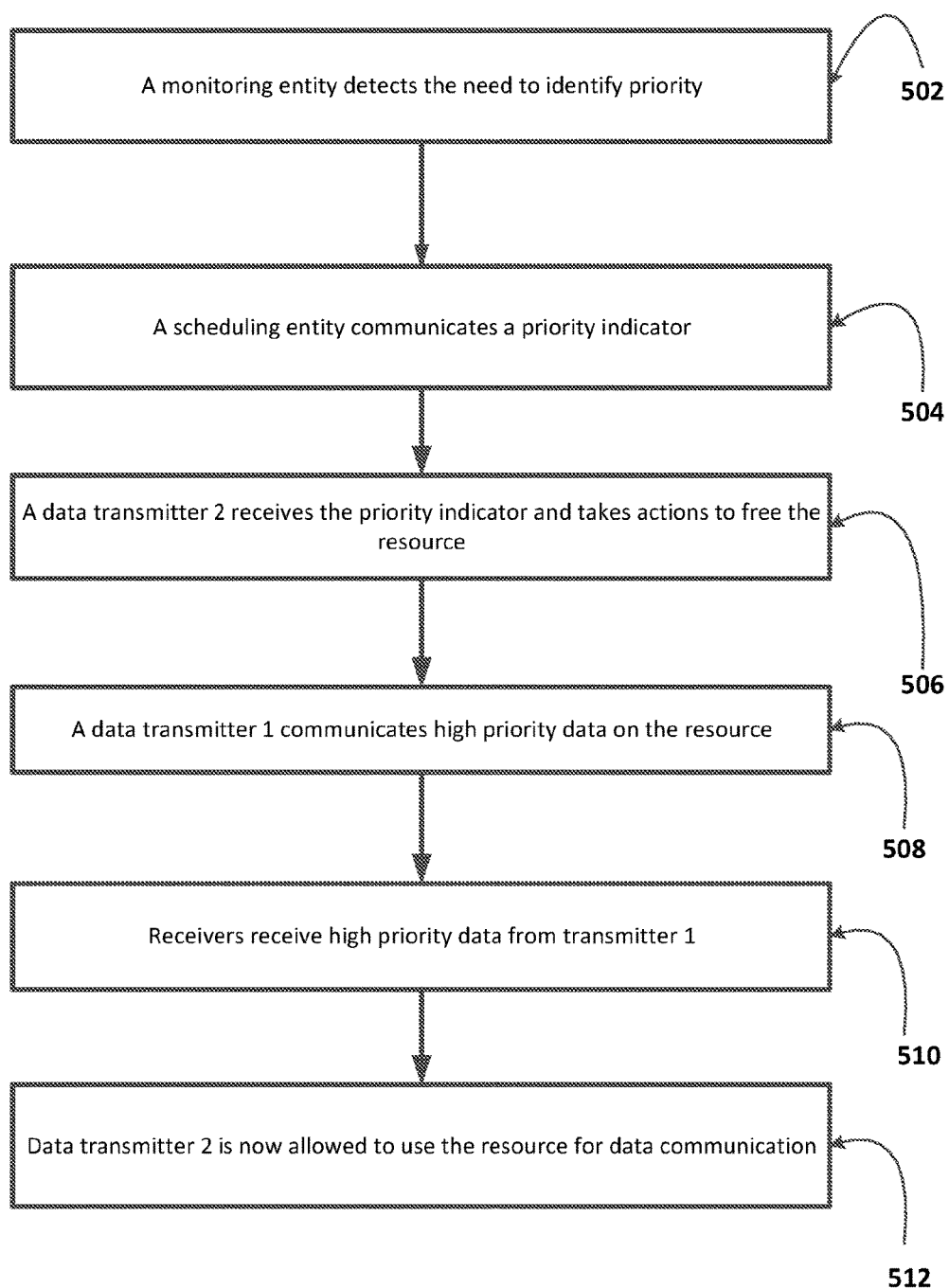
FIG. 5 shows an example flow diagram.

FIG. 5 shows an example flow diagram in accordance with exemplary embodiments. In embodiments, FIG. 5 may use one or more features and/or embodiments described in FIG. 4. In embodiments, FIG. 5 may be performed by a UE, such as UE 402, that includes various components, such as a data transmitter/receiver, scheduler, and monitoring entity, described in FIG. 4. At step 502, a monitoring entity, located in a UE or in the eNB, detects the need to indicate priority. In embodiments, the monitoring entity measures the amount of received traffic on a resource pool. In embodiments, the received traffic may be scheduling assignments and/or data. As such, the monitoring entity monitors the amount of data which waits to be transmitted by data transmitter 1 (i.e., stored in a buffer) including the priority associated with this data.

In additional embodiments, when the data transmitter 1 is within a network provided coverage by an eNB, the monitoring may be based on Buffer Status Report (BSR) messages received from data transmitter 1 to the eNB; and as such, the monitoring entity may be located in the eNB instead of in a UE hosting data transmitter 1. The BSR indicates the amount of data, for each priority level, which needs to be sent from the UE.

In embodiments, when either (i) the measured received traffic exceeds a threshold, (ii) the amount of data, with a certain priority to be sent from data transmitter 1, exceeds a threshold, and/or (iii) when the priority level of data to be sent from data transmitter 1 exceeds (or is below) a threshold, the monitoring entity informs the scheduler with a trigger.

At step 504, after having received a trigger from the monitoring entity, the scheduler communicates a priority indicator as part of a scheduling assignment (SA). In embodiments, there are one or more ways to represent this priority information element. By way of non-limiting examples, the priority information element can be represented as follows:

Embodiment 1

A single priority bit indicating "low priority" or "high priority."

Embodiment 2

A set of values, e.g. 0-7, where 0 is the lowest priority and greater values indicate higher priority levels. However, in other examples, 0 may indicate the highest priority and increasing values may indicate lower priority levels.

Embodiment 3

By using special values of the identity part of the SA (SA L1 ID) that are not used for ordinary addresses. For example, the present invention can use values such as, for example, 11111000-11111110, or other values, to indicate different levels of "priority" SAs. An SA which carries a "priority" may not carry an address, and may need to be read by all receivers. This is particularly, but not exclusively, suitable for broadcast transmission.

In Embodiment 1, the scheduler can indicate, on behalf of a data transmitter, either "normal" or "high priority" in the priority bit in the SA with the level of priority based on a value, such as, QoS information associated with the scheduler itself and/or the receiver(s) (e.g., within a multicast group or a single receiver—for unicast). QoS information may have been preconfigured in the scheduler or received by signalling message(s) from the eNB, the core network, a ProSe function and/or an application server. A ProSe function may be a node in the core network in charge of certain control and configuration of the D2D communication in the UEs. Additionally, a higher QoS may be given a higher priority than other communicated information and may be based on agreements on the type of service subscription level associated with a UE and/or the quality level of different services (e.g., guaranteed bit rate (GBR) for video content may have a higher priority than non-GBR audio content).

Thus "normal" and "high priority" can be based upon comparing one or more features between different types of data. As such, the priority level may be determined prior to the implementation of the determining what has a greater level of priority.

Additionally, the priority may be based on the type of message. For example, an emergency/medical alert message (e.g., that includes an identifier, such as a code, that indicates the type of message) may be given higher priority than a message associated with advertisements associated with a commercial business.

Before or even during transmission of SAs, the scheduler may have opportunities to receive SAs communicated by other UEs, based on, for example, gaps introduced in the SA time transmission pattern.

Embodiment 2 provides for finer granularity of priority levels than Embodiment 1. For example, the set of values may be associated with different levels of content quality, different levels of latency, and/or any other provided service that can be differentiated by a service provider (e.g., services and subscription levels that are charged different monetary values by a service provider) that can be charged for differing quantities of money. In embodiments, a transmitter using a given priority will typically refrain from using a resource if there are other transmitters using higher priority than itself.

In Embodiment 3, there may be two or more priority levels. To indicate the "priority", a specific type of SA is sent, which does not carry a normal identity and, instead, a special value of the identity indicating the priority is used. In embodiments, the identity normally is used by the receiver to judge whether the SA corresponds to any particular data part. These "special value" identities should be read typically by all UEs and will not correspond by a data part. In embodiments, the identities of the transmitter and/or receivers may still be included in other layers of the protocol stack. Accordingly, the transmitter communicates the data associated to the SA carrying the priority indicator.

At step 506, the UE communicates the priority indicator to a data transmitter, such as data transmitter 2, as described in FIG. 4. In embodiments, the data transmitter 2 reads SAs communicated by scheduler(s) and compares the priority it would use in its own SAs with the priority in any other received SA on the same source. In embodiments, in the event that the data transmitter 2 is using "low priority" (e.g., only receiving information associated with QoS lower than a particular threshold) and it receives "high priority" (e.g., receives information associated with a QoS higher than a particular threshold), the data transmitter 2 may refrain from using the same resource in some of the D2D transmissions. In further embodiments, additional rules may be considered when deciding whether to drop a communication or not. For example, if the interfering transmission by data transmitter 2 uses at least partly different resources than being used by data transmitter 1, then there is no need to drop the interfering communication. Data transmitter 2 may drop the parts of the communication that would interfere with high priority communication (e.g., communications on same resource blocks or same sub-frames).

In some embodiments, transmitter 2 may decide to drop or suspend at least part of its data communication, even though such data has already been indicated by some SA to its interested receivers. In the event that the priorities are the same, the data transmitter 2 may, for example, draw a random number and refrain from using the resource if this random number is below a threshold. In further embodiments, the data transmitter 2 is configured with a fixed behaviour (e.g., to always refrain). For example, priority may be provided to a particular UE based on the UE's geographic location (e.g., a UE in a medical facility has greater priority than a UE located in restaurant). In some embodiments, the priority is based on the proximity. For example, a UE 1 which is within close proximity to other UEs is provided with higher priority when communicating to those UEs, while a UE 2 which is more far away from those UEs is provided with lower priority. Or the other way around. In additional embodiments, for example, if the UE is associated with a particular account which has premium services (e.g., GBR associated with voice over IP (VoIP), video/movie subscriptions, etc.), then that UE may receive a greater priority in comparison to a UE uses other particular types of services (e.g., phone and Internet capabilities).

At step 508, data transmitter 1, in the UE, proceeds to communicate the high priority data. In embodiments, the transmitter may have previously received information from the scheduler that the resource is now free.

At step 510, receivers receive high priority data. In embodiments, receivers interested in the communication from data transmitter 1, receive the SA and the priority indicator. Thus, the receivers may adapt their behaviour in order to prioritize reception of different data flows according to their priorities. For example, in case of hardware and/or software limitations at the receiver, high priority flows are prioritized and lower priority flows may be discarded. Also, the receiver may refrain from starting transmission of other signals/channels in order to prioritize reception of the high priority data.

At step 512, the UE sends information to the data transmitter 2. In embodiments, the data transmitter 2 may have previously received an indication from the scheduler that the resource is available for the communication.

While a series of blocks have been described with regards to FIG. 5, the blocks and/or the order of the blocks may be modified in some embodiments. Further, non-dependent blocks may be performed in parallel.

Figure 6:
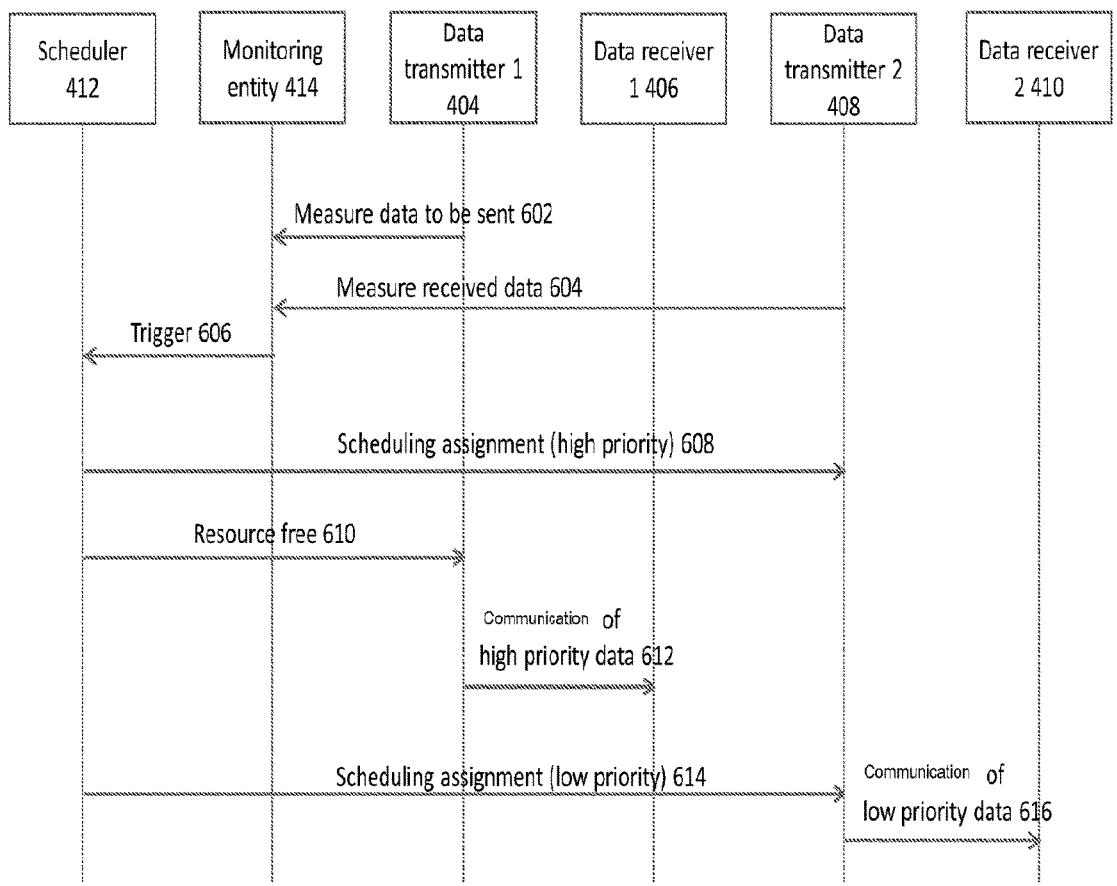
FIG. 6 shows an example communication flow.

FIG. 6 shows an example flow diagram in accordance with aspects of the present invention. FIG. 6 shows a data transmitter/receiver 1 404, a data receiver 1 406, a data transmitter 2 408, a data receiver 2 410, a scheduler 412, and a monitoring entity 414. In flow 602, data transmitter/receiver 1 404 sends data which is measured by monitoring entity 414. In embodiments, based on flow 602, monitoring entity 414 determines resource availability as described in FIG. 5. In flow 604, data transmitter 2 408 sends additional data that is also analysed by monitoring entity 414 to determine resource availability. In embodiments, flows 602 and 604 may be associated with different priority levels. In embodiments, monitoring entity 414 determines an availability of resources, and sends flow 606 which is a trigger to scheduler 412. In embodiments, scheduler 412 determines a scheduling assignment (SA) and sends, in flow 608, to data transmitter 2 408 regarding high priority data is about to be sent. Additionally, flow 608 can be also sent to data receiver 1 406 in order for it to know that high priority data will be sent at a later time (e.g., in flow 612). In embodiments, scheduler 412 sends a message, in flow 610, to data transmitter/receiver 1 404 that resources are free and that high priority data can be communicated. In embodiments, data transmitter/receiver 1 404 communicates high priority data, in flow 612, to data receiver 1 406. Additionally, scheduler 412 sends a scheduling assignment regarding lower priority data than that data communicated in flow 612. The scheduling assignment in flow 614 indicates to data transmitter 2

408 to communicate the low priority data. Thus, in flow 616, data transmitter 2 408 communicates low priority data to data receiver 2 410.

FIGS. 7-11 show example flow diagrams in accordance with exemplary embodiments. While a series of blocks have been described with regards to FIGS. 7-11, the blocks and/or the order of the blocks may be modified in some embodiments. Further, non-dependent blocks may be performed in parallel.

Figure 7:
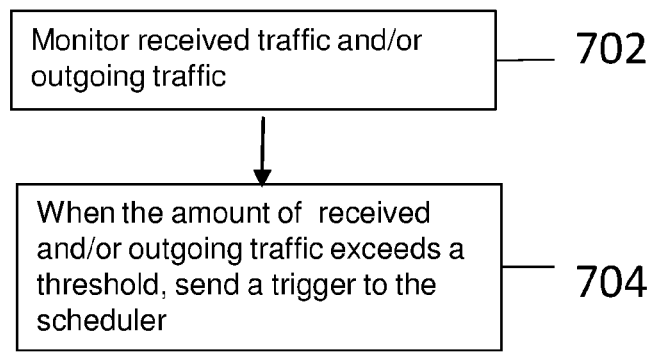
FIGS. 7-11 show example flow diagrams.

FIG. 7 shows an example flow diagram in accordance with exemplary embodiments. FIG. 7 describes one or more operations performed by a monitoring entity, such as monitoring entity 414. At step 702, the monitoring entity may receive traffic and/or outgoing traffic. At step 704, when the amount of received and/or outgoing traffic exceeds a threshold, a trigger (e.g., a ping, a message, etc.) may be sent to the scheduler.

Figure 8:
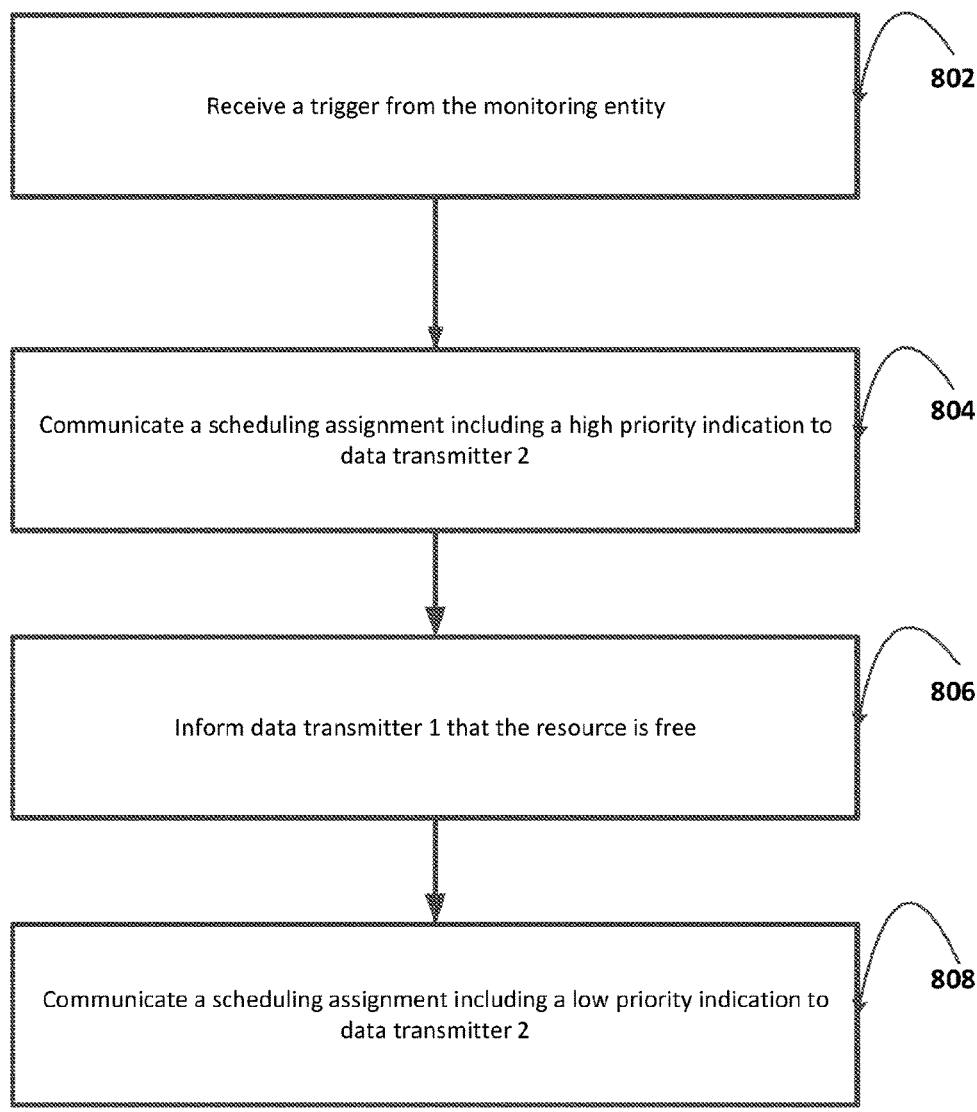

FIG. 8 shows an example flow diagram in accordance with exemplary embodiments. FIG. 8 describes one or more operations performed by a scheduler, such as scheduler 412 described in FIG. 4. At step 802, a scheduler receives a trigger from a monitoring entity. At step 804, the scheduler, based on the trigger, communicates a scheduling assignment including a high priority indication to a data transmitter 2, such as data transmitter 2 408 described in FIG. 4. At step 806, the scheduler informs data transmitter 1, such as data transmitter/receiver 1 404 described in FIG. 4, that the resource is free. At step 808, the scheduler communicates a scheduling assignment including a low priority indication to data transmitter 2.

Figure 9:
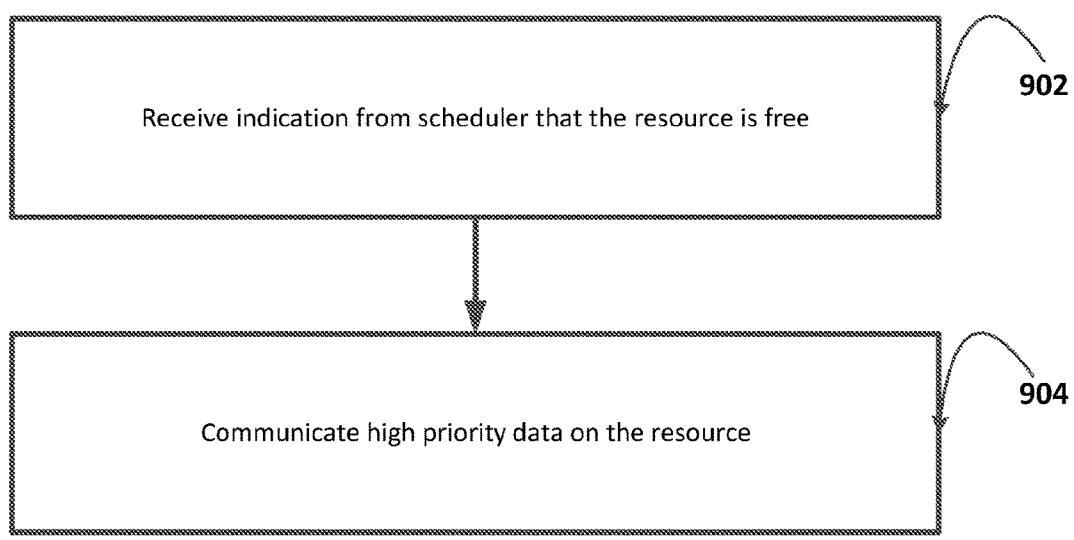

FIG. 9 shows an example flow diagram in accordance with exemplary embodiments. FIG. 9 describes one or more operations performed by a data transmitter 1, such as data transmitter/receiver 1 404 described in FIG. 4. At step 902, the data transmitter 1 receives an indication from the scheduler that a resource is free. At step 904, the data transmitter 1 communicates the high priority data on/across the resource.

Figure 10:
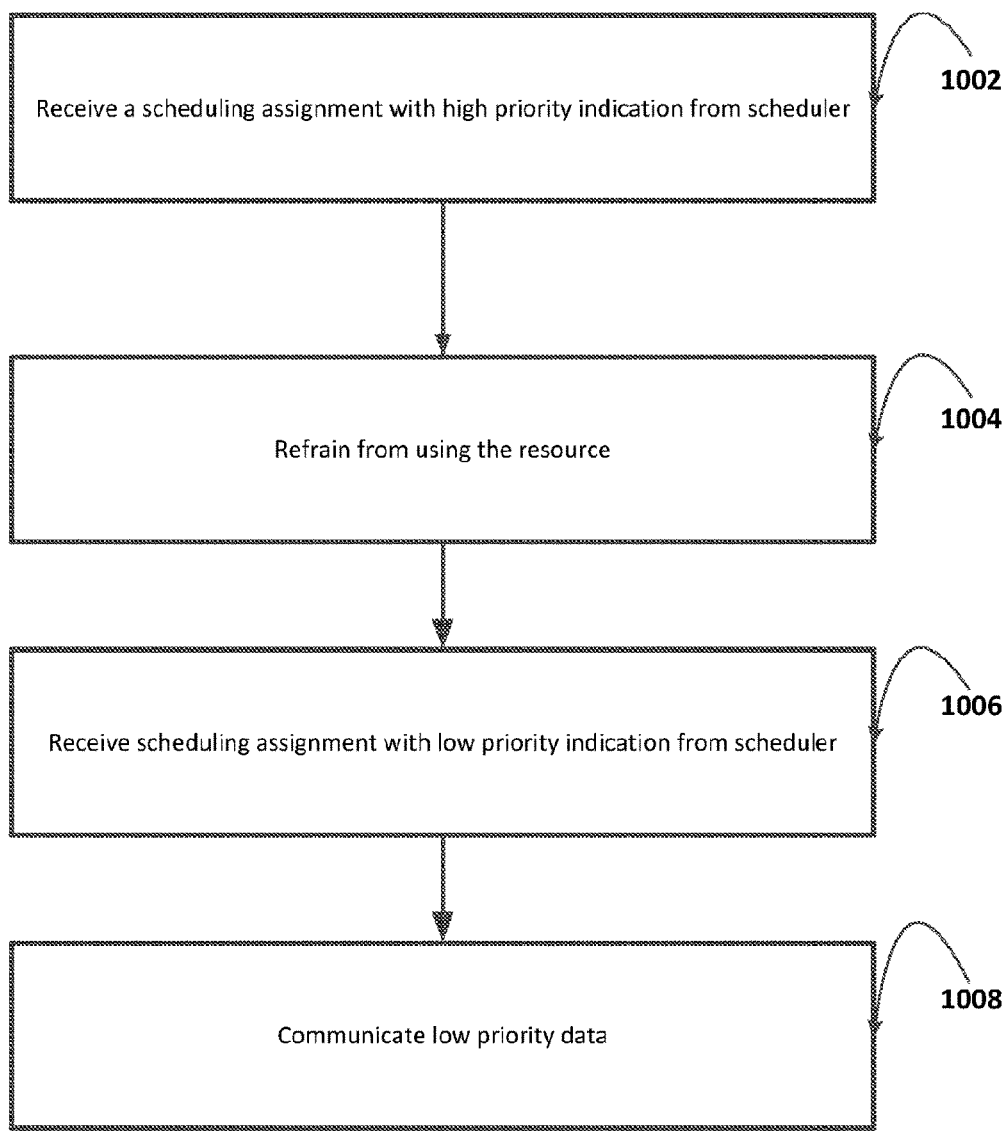

FIG. 10 shows an example flow diagram in accordance with aspects of the present invention. FIG. 10 describes one or more operations performed by a data transmitter, such as data transmitter 2 408 described in FIG. 4, in regards to scheduling "comeback." At step 1002, the data transmitter 2 receives a scheduling assignment with a high priority indication from a scheduler. At step 1004, the data transmitter 2 refrains from using the resource. In embodiments, when refraining from using the resource, alternatives may exist on how data transmitter 2 detects when to "comeback." For example, a timer or counter may be started by data transmitter 2 and may "comeback" to using a resource after a particular time or number of SA cycles. Thus, for example, if the data transmitter 2 receives a scheduling assignment at 10:01:00 a.m., the data transmitter 2 may start a timer that stops at 10:01:04 a.m.; and which results in the data transmitter 2 to again analyse the scheduling assignment with the high priority.

Figure 11:
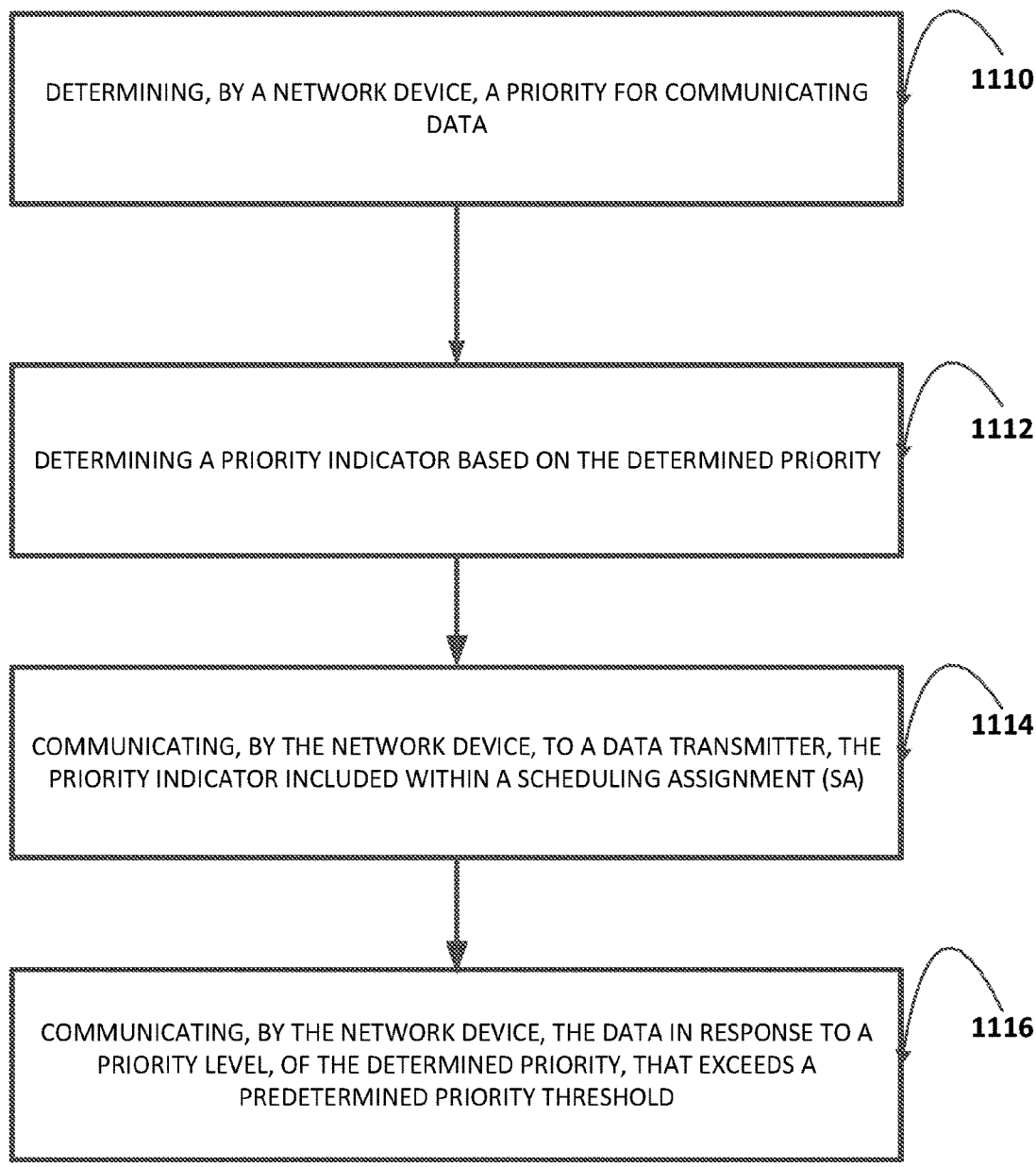

In another example, the data transmitter 2 may wait until a scheduling assignment, sent by a scheduler, indicates the correct priority and then the data transmitter 2 may retroactively analyze data and proceed to use resources on the spectrum. At step 1006, the data transmitter 2 receives scheduling assignment with low priority indication from the scheduler. At step 1008, the data transmitter 2 communicates the low priority data. In embodiments, the data transmitter 2 reads SAs communicated by scheduler(s) and compares the priority it would use in the own SAs, with the priority in any other received SA on the same resource. FIG. 11 shows an example flow diagram in accordance with aspects of the present invention. At step 1110, a network device determines a priority for communicating data. At step 1112, the network device determines a priority indicator based on the determined priority. At step 1114, the network device communicates, to a data transmitter, the priority indicator included with in a scheduling assignment (SA). At step 1116, the network device communicates the data in response to a priority level, of the determined priority, that exceeds a predetermined priority threshold.

In embodiments, the network device measures an amount of traffic for a resource, whereby the determined priority is based on at least the measured amount of traffic, and the resource is associated with a cellular network and time and frequencies associated with the cellular network. In embodiments, the determined priority is based on different sets of values associated with different levels of quality of service (QoS). In embodiments, the SA may be sent to multiple receivers (406, 410) within a broadcast transmission and using particular values as part of the SA. In embodiments, the communication of the data is associated with device-to-device (D2D) communications. In embodiments, the priority indicator provides an indication to use or not use the resource, and a user equipment (UE) that receives the priority indicator uses the resource in accordance with the priority indicator. In embodiments, the priority indicator indicates priority based on a distance between different devices. In embodiments, a user equipment (UE) modifies its own behavior based upon reception of the priority indicator. In embodiments, the priority indicator is communicated to a receiving device (406) that uses the resource in accordance with the priority indicator. In embodiments, the receiving device (406) refrains from using the resource in response to determining that the priority indicator indicates that the resource is not free. In embodiments, in response to determining that the priority indicator indicates that the resource is free, the receiving device (406) communicates data that has a priority level that is below the predetermined priority threshold. In embodiments, the SA does not carry an address and is read by all receivers.

Figure 12:
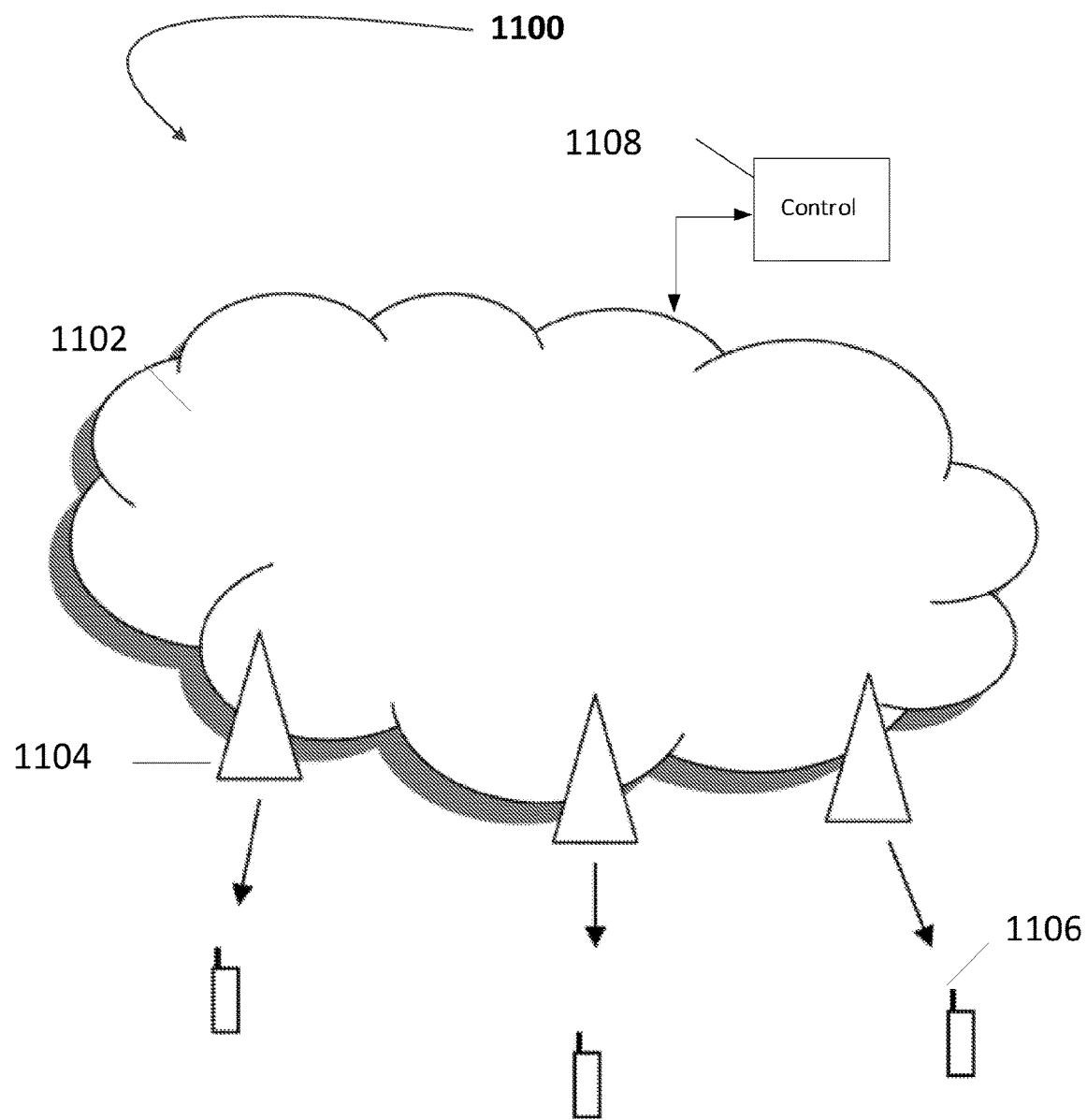
FIG. 12 shows a wireless communication system in accordance with exemplary embodiments.

Referring to FIG. 12, a wireless communication deployment 1100 in accordance with exemplary embodiments includes an access node 1104 serving a wireless communication device (WCD) 1106. Examples of WCDs include, but are not limited to, mobile telephones, user equipments (UEs), personal digital assistants, electronic readers, portable electronic tablets, wireless sensors, machine communication devices, personal computers, and laptop computers. Furthermore, the device 1106 may be a legacy UE or dynamic TDD capable UE. Access node 1104 may be, for example, a base station, an eNodeB, relay node, or gateway type device, and is capable of communicating with device 1106, along with any additional elements suitable to support wireless communication between wireless communication devices or between a wireless communication device and another communication device, such as landline telephone. The access node 1104 may be in communication with, for instance via a network 1102, one or more control nodes 1108, such as a Radio Network Controller (RNC), a Mobility Management Entity (MME), a Mobile Switching Center (MSC) or ProSe function. Although node 1108 is explicitly identified as a control node, each of nodes 1104, 1106, and 1108 may be understood as a "control" node to the extent that it includes a control unit or otherwise implements control functions.

Figure 13:
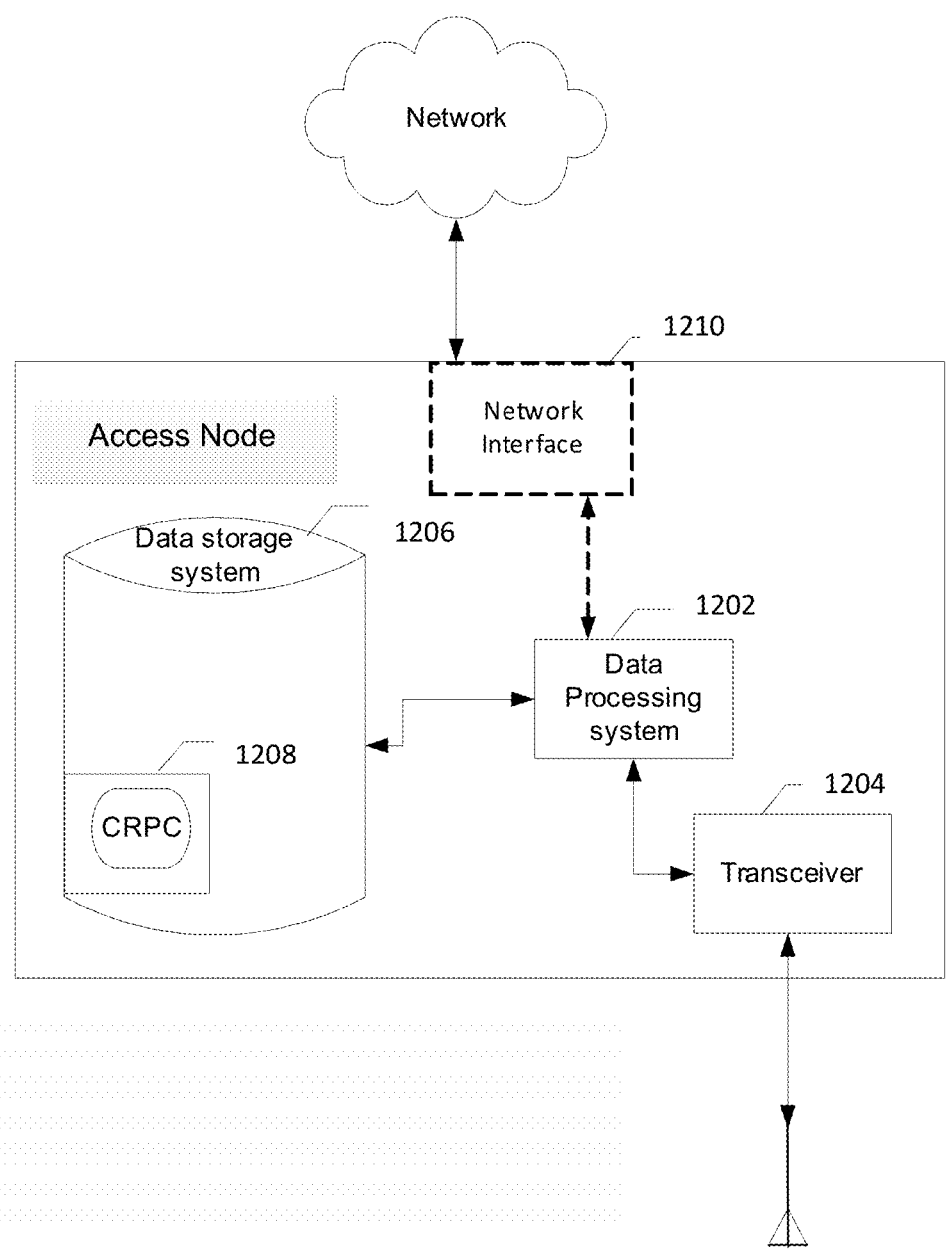
FIG. 13 shows an exemplary access node.

FIG. 13 illustrates a block diagram of an exemplary access node, such as node 1104 shown in FIG. 12. As shown in FIG. 13, the access node 1104 may include: a data processing system 1202, which may include one or more microprocessors and/or one or more circuits, such as an application specific integrated circuit (ASIC), field-programmable gate arrays (FPGAs), and the like; a network interface 1210; a transceiver 1204, and a data storage system 1206, which may include one or more non-volatile storage devices and/or one or more volatile storage devices (e.g., random access memory (RAM)). According to some embodiments, the data processing system 1202 may comprise a control unit used for selection of transmission parameters.

In embodiments where data processing system 1202 includes a microprocessor, computer readable program code (CRPC) 1208 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1202 to perform steps described above (e.g., steps described above with reference to the flow charts shown in FIGS. 7-10). In other embodiments, the access node 1104 is configured to perform steps described herein without the need for code. That is, for example, data processing system 1202 may consist merely of one or more ASICs. Hence, the features of the embodiments described herein may be implemented in hardware and/or software. For example, in particular embodiments, the functional components of the base station described above may be implemented by data processing system 1202 executing computer instructions, by data processing system 1202 operating independent of any computer instructions, or by any suitable combination of hardware and/or software.

Figure 14:
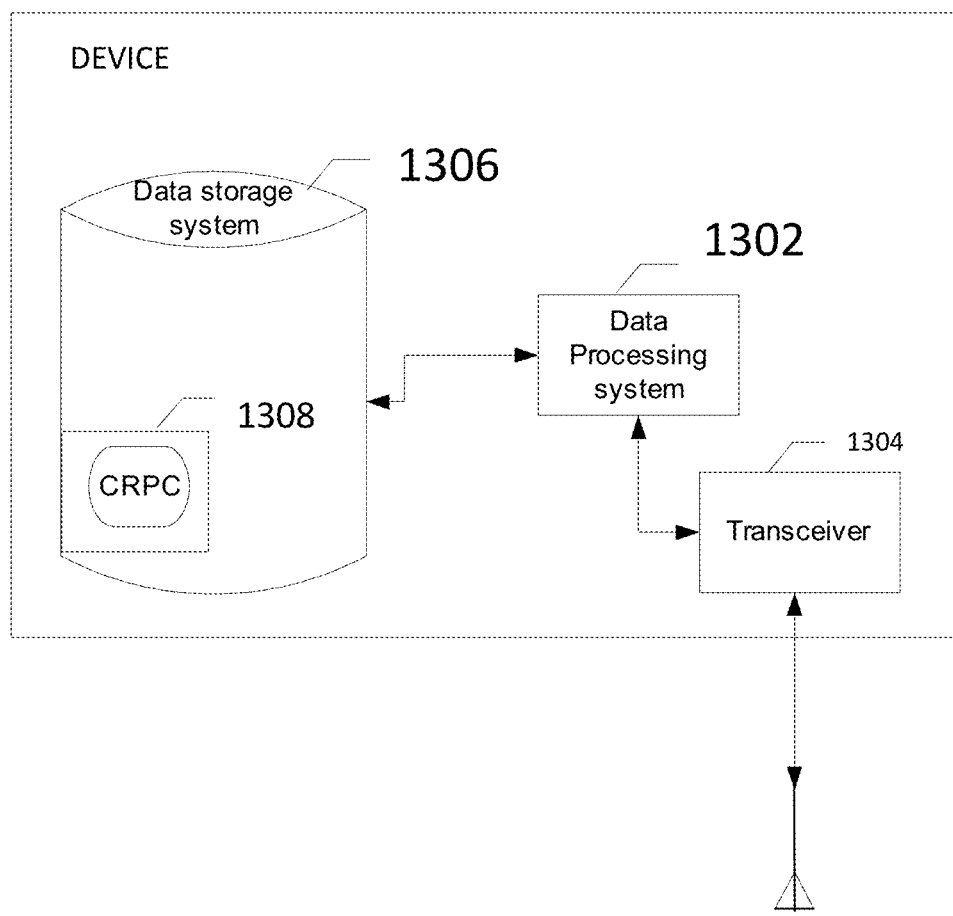
FIG. 14 shows an exemplary wireless device.

FIG. 14 illustrates a block diagram of an exemplary wireless device, such as UE 402, data receiver 1 406, data transmitter 2 408, and/or data receiver 2 410, as shown in FIG. 4. As shown in FIG. 14, the device may include: a data processing system 1302, which may include one or more microprocessors and/or one or more circuits, such as an application specific integrated circuit (ASIC), field-programmable gate arrays (FPGAs), and the like; a transceiver 1304, and a data storage system 1306, which may include one or more non-volatile storage devices and/or one or more volatile storage devices (e.g., random access memory (RAM)). According to some embodiments, the data processing system 1302 may comprise a control unit used for selection of transmission parameters.

In embodiments, where data processing system 1302 includes a microprocessor, computer readable program code (CRPC) 1308 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1302 to perform steps described above (e.g., steps described above with reference to the flow charts shown in FIGS. 7-10). In other embodiments, the device is configured to perform steps described herein without the need for code. That is, for example, data processing system 1302 may consist merely of one or more ASICs. Hence, the features of the embodiments described herein may be implemented in hardware and/or software. For example, in particular embodiments, the functional components of the base station described above may be implemented by data processing system 1302 executing computer instructions, by data processing system 1302 operating independent of any computer instructions, or by any suitable combination of hardware and/or software.

Although terminology from 3GPP LTE has been used in this disclosure to exemplify the exemplary embodiments, one of ordinary skill in the art would understand this as not limiting the scope of the present embodiments to only the aforementioned system. Other wireless systems, including HSPA, WiMax, UMB and GSM, may also benefit from exploiting the ideas covered within this disclosure.

Furthermore, the terminology such as evolved NodeB (eNB) and UE are non-limiting and does in particular do not imply a certain hierarchical relation between the two; in general "evolved NodeB" ("eNB") could be considered as device 1 and "UE" device 2, and these two devices communicate with each other over some radio channel.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

ABBREVIATIONS

D2D device-to-device
NW network
DRX Discontinuous reception
SA Scheduling Assignment
ProSe Proximity-based Services
QoS Quality of Service

What is claimed is:

1. A method implemented in a network device for managing device-to-device (D2D) communications, the method comprising:
   determining, by the network device, a priority for communicating data;
   measuring by the network device, an amount of traffic for a resource, wherein the determined priority is based on:
      at least the measured amount of traffic; and
      different sets of values associated with different levels of quality of service (QoS);
   determining a priority indicator based on the determined priority, wherein the priority indicator indicates priority based on a distance between different network devices;
   communicating, by the network device, the priority indicator included within a scheduling assignment (SA) to a data transmitter for communicating data,
   wherein the priority indicator provides an indication to use or not use a resource to the data transmitter such that the data transmitter uses the resource in accordance with the priority indicator and modifies its own behavior based upon reception of the priority indicator; and
   communicating, by the network device, the data, in response to a priority level, of the determined priority, that exceeds a predetermined priority threshold.

2. The method according to claim 1, wherein the resource is associated with a cellular network and time and frequencies associated with the cellular network.

3. The method according to claim 1, wherein the SA may be sent to multiple receivers within a broadcast transmission and using particular values as part of the SA.

4. The method according to claim 1, wherein the communication of the data is associated with the D2D communications.

5. The method according to claim 1, wherein the priority indicator is communicated to a receiving device that uses a resource in accordance with the priority indicator.

6. The method according to claim 5, wherein the receiving device refrains from using the resource in response to determining that the priority indicator indicates that the resource is not free.

7. The method according to claim 5, wherein, in response to determining that the priority indicator indicates that the resource is free, the receiving device communicates data that has a priority level that is below the predetermined priority threshold.

8. The method according to claim 1, wherein the SA does not carry an address and is read by all receivers.

9. A network device for managing device-to-device (D2D) communications, the network device comprising:

a processor; and a computer readable medium coupled to the processor, said computer readable medium containing instructions executable by the processor, whereby the device is operative to:

determine a priority for communicating data;

measure an amount traffic for a resource, wherein the determined priority is based on:

at least the measured amount of traffic; and different sets of values associated with different levels of quality of service (QoS);

determine a priority indicator based on the determined priority;

communicate the priority indicator included within a scheduling assignment (SA) to a data transmitter for communicating data, wherein the priority indicator indicates priority based on a distance between different network devices, wherein the priority indicator provides an indication to use or not use a resource to the data transmitter such that the modifies its own behavior based upon reception of the priority indicator; and communicate the data, in response to a priority level, of the determined priority, that exceeds a predetermined priority threshold.

10. The network device according to claim 9, wherein the resource is associated with a cellular network and time and frequencies associated with the cellular network.

11. The network device according to claim 9, wherein the SA may be sent to multiple receivers within a broadcast transmission and using particular values as part of the SA.

12. The network device according to claim 9, wherein the transmission of the data is associated with the D2D communications.

13. The network device according to claim 9, wherein the SA does not carry an address and is read by all receivers.

14. The network device according to claim 9, wherein the network device is at least one of a base station and a user equipment.

15. The network device according to claim 9, wherein the priority indicator is communicated to a receiving device that uses a resource in accordance with the priority indicator.

16. The network device according to claim 15, wherein the receiving device refrains from using the resource in response to determining that the priority indicator indicates that the resource is not free.

17. The network device according to claim 15, wherein, in response to determining that the priority indicator indicates that the resource is free the receiving device communicates data that has a priority level that is below the predetermined priority threshold.

* * * * *